UNITED STATES PATENT OFFICE.

HERMANN WIESE, OF WALLACEBURG, ONTARIO, CANADA.

PROCESS OF TREATING SUGAR-JUICES.

1,200,787.  Specification of Letters Patent.  Patented Oct. 10, 1916.

No Drawing.  Application filed October 25, 1912.  Serial No. 727,690.

*To all whom it may concern:*

Be it known that I, HERMANN WIESE, a subject of the King of Great Britain and Ireland, residing at Wallaceburg, in the Province of Ontario and Dominion of Canada, have invented certain new and useful Improvements in Processes of Treating Sugar-Juices, of which the following is a specification.

The invention relates to processes for the treating of sugar, of that type in which the purification of the juice is effected by liming. In the present state of the art, it is usual to treat the unrefined sugar juices with an oxid or hydroxid of lime, the quantity used varying from 2% upward, based on the solid sugar contained in the solution. When the lime is separated from the juice it is in the form of a carbonate, and is generally of little or no value, or even a source of expense in its removal and disposition.

My improved process involves the discovery that the purification of the juices can be effected by the use of precipitated carbonate of lime in place of the oxid or hydroxid. Thus a large item of expense in the usual liming process is eliminated.

A further feature of the invention is the novel method of purifying or revivifying the calcium carbonate, so that the same material may be repeatedly used in the purification process.

In carrying out my improved process, the juice to be treated, either as directly extracted from the cane or as a solution of raw sugar, and of a density of from 10° to 45° Brix, is first heated to a temperature of about 50° C., and is then treated with precipitated carbonate of lime, the quantity varying according to the quality of the juice, from one to ten per cent., based upon the solid sugar content of the solution. The solution is then raised in temperature to the boiling point, and as a result of the presence of the carbonate of lime in the hot solution, the mechanical and organic impurities are combined with the carbonate, and the juice is also decolorized. The solution is then filtered to remove the carbonate with the contained impurities.

The treatment thus far described, while decolorizing and purifying the sugar, does not remove the glucose or invert sugar. This may be eliminated by a liming treatment, in which one-fourth to one per cent. of calcium hydroxid, preferably in the form of milk of lime, is added to the solution, which is then raised to a temperature of from 70° to 100° C. The destruction of the invert sugar colors the solution, but this color may be again removed by carbonating until neutral, and then reheating the solution to form 70° to 100° C., with the carbonate of lime present therein. When the solution is again filtered, it will be of a high degree of purity.

When my process is carried on continuously, the carbonate of lime, removed from the juice by filtration, is purified in the following manner: The lime cake, as obtained from the filter press, is mixed with water and agitated; and is then heated in a closed container to a temperature higher than that to which it was subjected when in the sugar juice. This will decompose the chemical combination between the carbonate of lime and the mechanical and organic impurities removed from the sugar, and the latter may then be separated by washing and filtration. The revivified carbonate of lime may then be used again in the first step of the process, and the unavoidable slight loss will be compensated for by the additional carbonate of lime resulting from the carbonization of the milk of lime. Thus the only additional lime needed is the from one-fourth to one per cent., which is used in the second step of the process.

My process is especially applicable in cane sugar districts where the cost of lime is relatively high, and will enable the sugar producers to refine the sugar directly on the field.

The process as above described is also applicable to the refining of beet sugar.

What I claim as my invention is:

1. A process for treating sugar, comprising the treatment of the impure juice directly with finely divided carbonate of lime, raising the temperature of the solution with the carbonate present to from 70° to 100° C., filtering to remove the precipitate, treating with a relatively small percentage of lime to destroy the glucose, carbonating, reheating, and filtering.

2. A process for treating sugar, comprising the preliminary treatment of the impure juices directly with precipitated carbonate of lime, the heating of the solution in the presence of the carbonate of lime, filtering and the subsequent liming, carbonating, reheating, and filtering, to destroy the glucose and decolorize.

In testimony whereof I affix my signature in presence of two witnesses.

HERMANN WIESE.

Witnesses:
WM. J. BELKNAP,
JAMES P. BARRY.